UNITED STATES PATENT OFFICE.

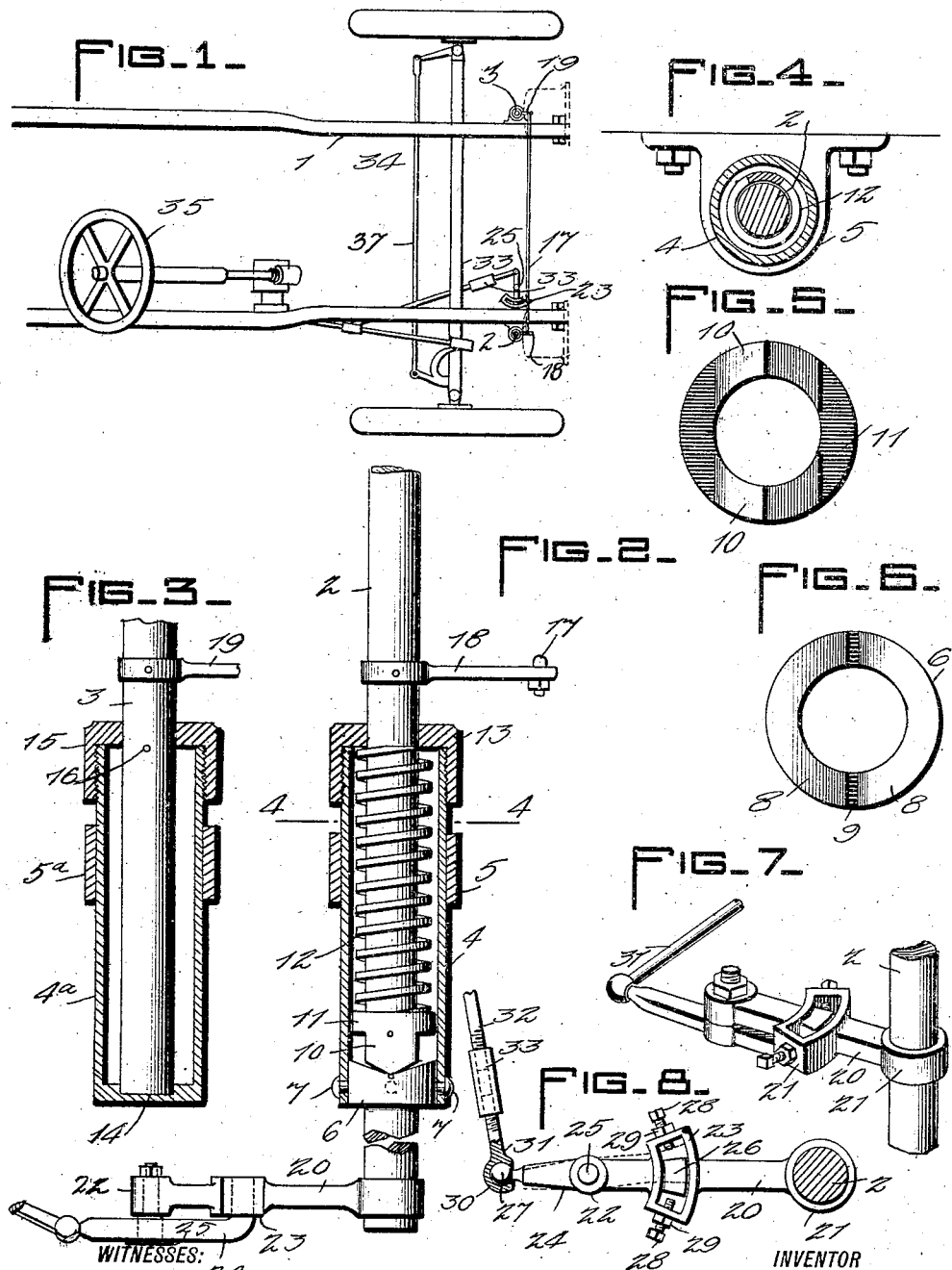

REUBEN EDWIN HARTMAN, OF ORANGE, TEXAS.

HEADLIGHT CONTROL.

1,198,348.

Specification of Letters Patent.    Patented Sept. 12, 1916.

Application filed April 21, 1916. Serial No. 92,648.

*To all whom it may concern:*

Be it known that I, REUBEN E. HARTMAN, a citizen of the United States, and a resident of Orange, in the county of Orange and State of Texas, have invented a new and useful Improvement in Headlight Controls, of which the following is a specification.

My invention is an improvement in head light controls, and has for its object to provide mechanism for constraining the head lights of a vehicle to turn with the front wheels and in the same direction, wherein mechanism is provided in connection with the mounting of the head lights for normally holding them in straight position and for returning them to such position when they have been displaced, and wherein the connection between the turning mechanism and the steering mechanism is a lost motion connection capable of adjustment to permit the steering mechanism to move within limits without affecting the head lights.

In the drawings: Figure 1 is a partial top plan view of an automobile frame provided with the improved control, Fig. 2 is a vertical section through the supporting shell or sleeve of one head lamp, Fig. 3 is a similar view of the shell or sleeve for the other head lamp, Fig. 4 is a section on the line 4—4 of Fig. 2, Fig. 5 is a bottom plan view of the shaft collar, Fig. 6 is a top plan view of the bearing collar or sleeve, Fig. 7 is a perspective view of the lost motion connection, and Fig. 8 is a top plan view of the same.

The present embodiment of the invention is shown in connection with the frame 1 of an automobile, and the head lamps indicated in dotted lines in Figs. 1 and 2 are supported on shafts 2 and 3, respectively, the said lamps being secured to the upper ends of the shafts in any usual or desired manner. The shaft 2 which supports the controlling mechanism for both head lamps is journaled in a sleeve or shell 4, which is connected to the frame of the vehicle by means of a supporting bracket 5, secured to the vehicle in any suitable or desired manner and embracing the sleeve or shell, as shown.

The shaft extends through the lower end of the shell, and a bearing ring 6 is arranged between the shaft and the shell at the lower end of the shell, the sleeve being held in place by screws 7 or the like. This bearing ring has its upper end cut away to form oppositely arranged bearing or cam surfaces 8, the said surfaces inclining inwardly and downwardly and meeting on a diameter of the ring. The ring is also provided with a diametrical groove 9 between the cam or bearing surfaces, for a purpose to be presently described, and depending lugs 10 on a collar 11 secured to the shaft cooperate with the bearing surfaces 8. This collar 11 is secured to the shaft and turns therewith and the lower ends of the lugs are beveled in opposite directions on a little sharper angle than the angle between the bearing surfaces 8.

A coil spring 12 encircles the shaft between the collar 11, and a cap 13, which is threaded on to the upper end of the shell and engages the upper end of the spring. The shaft 2 is free to move upward in the shell when the shaft is turned, and the lugs 10 ride up on the bearing surfaces 8, but it will be obvious that the spring will limit the upward movement of the shaft and will tend to return the shaft to the position shown in Fig. 2, that is, with the points of the lugs 10 in the angle between the cam surfaces 8.

The shaft 3 is mounted in a shell 4ª similar to the shell 4, but having its bottom closed and provided with a step bearing 14. The shell 4ª is connected to the frame of the vehicle by the bracket 5ª and a cap 15 is threaded on to the upper end of the shell. A pin 16 is passed through the shaft just below the cap to prevent upward movement of the shaft, and the shafts are connected by a link 17, the said link having its ends pivoted to radial arms 18 and 19 on the shafts 2 and 3 respectively. Each of these arms 18 and 19 has a bearing embracing the adjacent shaft and secured thereto in any suitable manner, and it will be obvious that when the shaft 2 is oscillated in either direction the shaft 3 will move therewith whether such oscillation is due to the connection between the shaft 2 and the steering mechanism or to the connection between the arms 18 and 19.

As is known, it is not desirable that the head lamps should swing with the slightest movement of the steering mechanism or front wheels, since in such case there will be a continuous jiggling of the lamps. For this reason a lost motion connection is provided between the shaft 2 and the steering control, the said mechanism being adjustable to vary the extent of lost motion. This connection is shown more particularly in Figs. 2, 7 and 8, wherein the shaft 2 is provided with a radial arm 20, the arm having a bearing 21 embracing the shaft. The outer end of the arm 20 is provided with a bearing 22 and intermediate the ends of the arm an arcuate guide-way 23 is provided extending transversely of the arm. A second arm 24 is pivoted to the outer end of the arm 20 by means of a bolt and nut 25, the bolt being passed through the arm and through the bearing 22 and engaged by the nut above the bearing. The arm 24 has a laterally extending head 26 at its outer end which engages the guide-way, and it will be evident that the arm 24 may swing with respect to the arm 20 within limits prescribed by the length of the guide-way. The guide-way is as before stated, arcuate and has the bolt 25 for its center.

That end of the arm 24 remote from the shaft 2 is provided with a ball 27 for connection with the connecting rod to be described, and set screws 28 are threaded through the ends of the guide-way for engaging the head at either end of the guide-way to permit the extent of movement of the arm 24 to be adjusted. Each set screw is engaged by a lock nut 29 to prevent displacement thereof, and it will be evident that by turning the screws the extent of lost motion between the arms 20 and 24 may be varied. The ball 27 engages a socket 30 on one of the sections 31 of a connecting rod consisting of the section 31 and a section 32, which are connected at their adjacent ends by a sleeve 33. These sections are oppositely threaded as are also the opposite ends of the sleeve and by turning the sleeve in the proper direction the sections may be adjusted toward and from each other.

The section 32 is connected to the steering lever arm by means of a sleeve 34, which is adjustably mounted on the arm and connected to the section 32 in any suitable or desired manner. The elements 8 and 10 which may be considered as coöperating cam blocks are designed to permit a turning movement of approximately 90 degrees in either direction, but since the colar 11 and the shaft must shift during this turning movement in either direction the spring will be compressed and the expansion of the spring when the shaft is released will return the parts to normal position. The groove 9 is to prevent flattening of the lugs 10, that is, to prevent wearing away of the apices of the said lugs and to compensate for wear, and the elements 10 may be easily re-shaped when they become worn. The sharper angle of the lugs 10 insures a better grip, and holds the head lamps steady.

In use, when the steering lever arm 37 is moved in either direction by the steering mechanism indicated generally at 35, the head lamps will not immediately follow the movement of the steering lever arm and they will not participate in this movement until the head 26 engages one of the set screws 28. As soon as this occurs the head lamps will begin to move in the same direction causing the rays of light to follow the road, and as the lugs 10 move over the bearing surfaces 8 the shaft 2 will be lifted, the spring will be compressed, and as soon as the wheels are returned to normal position the spring will return the head lights to normal position. It will be evident that the tension of the spring 12 may be varied by turning the cap 13 in the proper direction.

I claim:—

1. In combination, a sleeve or shell for attachment to a vehicle, a shaft journaled therein and adapted to carry a head lamp, a bearing ring between the sleeve and the shaft at the lower end of the sleeve, a collar secured to the shaft above the ring, said ring having a diametrical groove with its side walls inclined and the lower ends of the collar being beveled in opposite directions at a more acute angle than the angle between the walls of the groove, a cap threaded on to the upper end of the sleeve, and a spring arranged between the cap and the collar.

2. A lost motion connection for connecting the head lamp supporting shaft of a vehicle with the steering control, and comprising an arm extending radially from the shaft and having a transverse guide-way intermediate its ends, a second arm pivoted intermediate its ends to the outer end of the first-named arm and having a head engaging the guide-way, the outer end of the last-named arm being adapted for connection with the steering control, and set screws threaded through the ends of the guide-way for limiting the swinging movement of the arm.

3. A lost motion connection for connecting the head lamp supporting shaft of a vehicle with the steering control, and comprising an arm extending radially from the shaft and having a transverse guide-way intermediate its ends, a second arm pivoted intermediate its ends to the outer end of the first-named arm and having a head engaging the guide-way, the outer end of the last-named arm being adapted for connection with the steering control.

4. In combination, a sleeve or shell for attachment to a vehicle, a shaft journaled therein and adapted to carry a lamp, a bearing ring between the sleeve and the shaft at the lower end of the sleeve, a collar secured to the shaft above the ring, said ring having a diametrical groove with plane side walls, and the lower end of the collar being beveled in opposite directions at a more acute angle than the angle between the walls of the groove, and a spring normally pressing the shaft downward, said ring having the bottom of the groove deepened.

REUBEN EDWIN HARTMAN.